United States Patent
Mani et al.

[19]

[11] Patent Number: 6,034,889
[45] Date of Patent: Mar. 7, 2000

[54] ELECTRICALLY ERASABLE AND PROGRAMMABLE NON-VOLATILE MEMORY HAVING A PROTECTABLE ZONE AND AN ELECTRONIC SYSTEM INCLUDING THE MEMORY

[75] Inventors: Christophe Mani, Plan d'Organ; Mohamad Chehadi, Aix en Provence, both of France

[73] Assignee: STMicroelectronics S.A., Gentilly, France

[21] Appl. No.: 09/177,899

[22] Filed: Oct. 23, 1998

[30] Foreign Application Priority Data

Oct. 24, 1997 [FR] France .................................. 97 13359

[51] Int. Cl.[7] ...................................................... G11C 7/00
[52] U.S. Cl. ................................ 365/185.04; 365/185.32; 365/195
[58] Field of Search ............................... 365/185.04, 195, 365/185.32; 380/4; 711/163, 164, 170

[56] References Cited

U.S. PATENT DOCUMENTS

| | | | |
|---|---|---|---|
| 5,363,334 | 11/1994 | Alexander et al. ...................... | 365/195 |
| 5,388,248 | 2/1995 | Robinson et al. ...................... | 365/195 |
| 5,592,641 | 1/1997 | Fandrich et al. ..................... | 365/185.04 |
| 5,663,922 | 9/1997 | Tailliet ..................................... | 365/221 |
| 5,749,088 | 5/1998 | Brown et al. ....................... | 365/185.04 |
| 5,812,446 | 9/1998 | Tailliet ................................. | 365/185.04 |
| 5,845,332 | 12/1998 | Inoue et al. .............................. | 365/195 |
| 5,862,075 | 1/1999 | Leconte et al. ..................... | 365/185.04 |
| 5,890,191 | 3/1999 | Espinor et al. .......................... | 711/163 |

FOREIGN PATENT DOCUMENTS

| | | |
|---|---|---|
| 0 287338 | 10/1988 | European Pat. Off. . |
| 0 326 053 | 8/1989 | European Pat. Off. . |

OTHER PUBLICATIONS

Preliminary European Search Report dated Jul. 10, 1998 with annex on French Application No. 9713359.

*Primary Examiner*—David Nelms
*Assistant Examiner*—Gene N. Auduong
*Attorney, Agent, or Firm*—Theodore E. Galanthay; Fleit, Kain, Gibbons, Gutman & Bongini, P.L.

[57] ABSTRACT

An electrically erasable and programmable non-volatile semiconductor memory includes memory registers that are addressable individually or by blocks. The memory also has a protection register in which a protection word can be written. The protection word has a given number of bits that encode a boundary address of the memory register or a block of memory registers. The boundary address divides the memory space into an upper zone and a lower zone. The protection word also has a zone bit whose value determines which of the two zones of the memory is to be write protectable.

17 Claims, 5 Drawing Sheets

ELECTRICALLY ERASABLE AND PROGRAMMABLE NON-VOLATILE MEMORY HAVING A PROTECTABLE ZONE AND AN ELECTRONIC SYSTEM INCLUDING THE MEMORY

CROSS REFERENCE TO RELATED APPLICATIONS

This application is based upon and claims priority from prior French Patent Application No. 97-13359, filed Oct. 24, 1997, the entire disclosure of which is herein incorporated by reference.

BACKGROUND OF THE INVENTION

1. Field of the Invention

The present invention relates to a non-volatile memory, and more specifically to an electrically erasable and programmable non-volatile memory having a read and/or write protectable zone and an electronic system incorporating such a memory.

Electrically erasable and programmable non-volatile memories are widely used as serial access memories in video devices designed for large scale consumption because such memories make it possible to store changeable information even if the power to the device is cut off. For example, such information could be the date or time of activation and duration of recording of a television broadcast which are programmed in a video tape recorder. This data is stored in registers that are read and write accessible so that it is possible to modify them. However, in some cases, write access to these registers must be locked through software control and unlocked only through a specified program sequence. In this case, it is said that the registers are write-protected. This reduces the risk of accidental modification (and therefore loss) of the data. Such accidental modification can be due to a mistake in handling by the user or to electrical disturbances in the instrument (known as "data corruption").

2. Description of the Related Art

In certain cases, it may even be desired that modification of the contents of the protected registers should not be allowed through software control but should require a modification of the hardware configuration (e.g., input signals) of the memory. Furthermore, in most applications, the same memory must also include registers that are always write accessible for the storage of transient data. There is therefore an identified need for a non-volatile memory in which at least one zone (i.e., a group of memory registers) is write protectable.

Because memories are electronic components that are manufactured identically and in large batches in order to reduce cost, a way to customize these memories is often provided so as to give the designer of an electronic system or device that incorporates these components the freedom to organize the available memory space into different variably-sized zones, some of which may be write-protected while others are not.

For this purpose, an EEPROM-type memory has been proposed. This memory, in a schematic representation, comprises a stack of memory registers divided into two memory zones, one of which is write-protectable while the other is not. The registers are identified by an address and are accessible by the indication of this address. Typically, the first register of the memory (located in a schematic representation at the bottom of the stack) is identified by an address of zero and the last register (located in a schematic representation at the top of the stack) is identified by the address whose value corresponds to the size of the memory (i.e., the total number of registers in the memory). The values of the address registers are usually expressed in hexadecimal notation, as shown by the use of a lower case "h" following the memory address, which consists of the digits 0 to 9 and/or the letters A to F.

Figure 1:
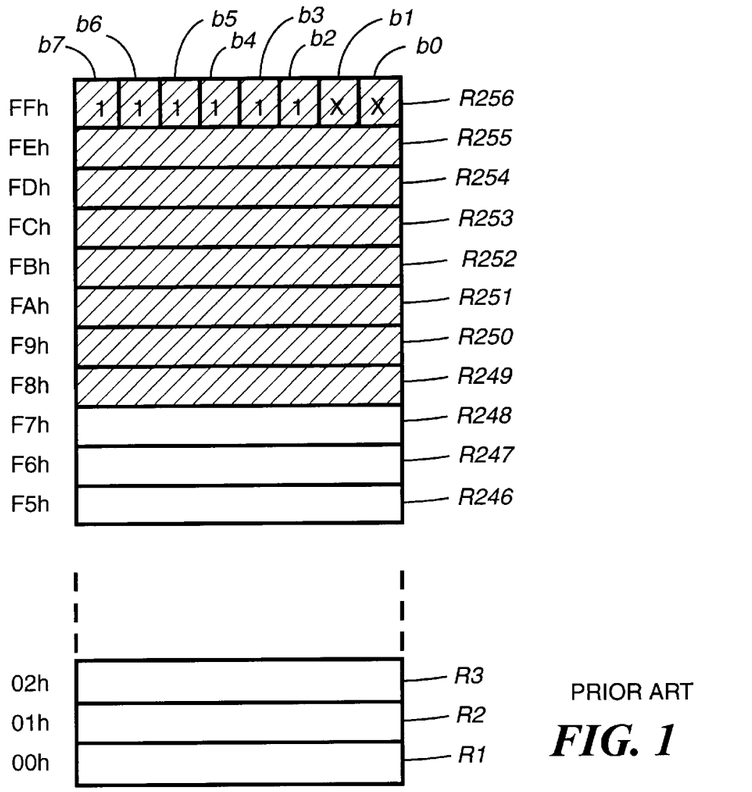
FIG. 1 is a diagram of the organization of the memory space of a conventional memory.

For example, the memory shown in FIG. 1 includes 256 registers R1 to R256 that each hold 8 bits. These registers are arranged, schematically speaking, in a stack. The capacity of the memory is therefore 256 bytes or 2048 bits (i.e., 2 Kbits). In FIG. 1, the address of a register is shown to the left of the register.

The last register R256, located at address FFh, is a special-use register. In particular, the data word that it contains has the twofold function of determining the size of the write-protected memory and making the write protection effective. In operation, the protection of a zone of memory is effective only when two conditions are met. First, there should be a specified pin of the memory taken to the logic 1 state. Second, a particular bit of a protection word contained in the last register of the memory, in this case the bit b2 (FIG. 1), should be in the logic 1 state. The state of the bits b0 and b1 of the protection word do not matter. The five most significant bits b3 to b7 of the protection word define the five most significant bits of the boundary address of the zone of the memory that is write-protected, the three least significant bits of the boundary address having arbitrarily the logic value 0. The term "boundary address" is understood to be the address of a memory register that constitutes a boundary of the memory zone concerned (i.e., the address of the first or last register of this zone).

The memory zone, between the address FFh of the last register R256 and the boundary register thus defined is then protected, for example in write mode. A memory write circuit verifies the conditions of protection of the memory zone (i.e., the state of the bit b2 of the word contained at the address FFh in the register R256 and the state of the above-mentioned pin of the memory), and compares the value of the five most significant bits of the address specified for the write operation with the value of the bits b3 to b7 of the protection word. If the value of the specified address is greater than that of the boundary address, the write operation is not performed. It can be seen that it is thus possible to obtain write protection for a zone of the memory whose size can be modified in steps of eight registers. In other words, the five most significant bits of the protection word define a block of adjacent registers (eight registers in this example), the registers of this block and the upper registers being write protected if the bit b2 of the protection word is in the logic 1 state. The memory is divided into two zones, a lower zone that is not write protected and an upper zone that is write protected when this condition is met.

This protection scheme is implemented as follows. With the word contained in the last register R256 initially having all its bits and especially the bit b2 in the logic 0 state (so that the entire memory is not write protected), the data that is to be stored in a write-protected manner is written in the registers located at the upper part of the memory (with the exception of the last register). For example, this may require five registers (giving a total of five bytes to be stored). It is therefore necessary to set apart a write-protected memory zone comprising at least five registers plus the protection register, giving a total of six. The binary word 111111xxb is then written in the last register R256. (In this binary word "111111xxb", the letter "b" indicates that the value of the word is expressed in binary notation and the sign "x" indicates that the value of the corresponding bit (here, bits b0 and b1) does not matter. The block of the last eight registers R249 to R256 of the memory, whose addresses have the same value for the-most significant bits and which form the upper zone of the memory, are then write-protected. In FIG. 1, these registers are shaded gray. The other registers, which form the lower zone of the memory, are not write-protected.

This protection principal can be extended to include memories of different capacity and/or memories that are organized differently. However, the variably-sized protectable memory zone is always located in the upper part of the memory. This is because the special-use register that receives the protection word is the last register of the memory. Typically, the first registers of the memory are often reserved for the storage of data needed to initialize the system incorporating this memory (these first registers being therefore themselves write-protected in a manner that cannot be modified by programming), and the rest of the registers are entirely left at the disposal of the user (who is the designer of an electronic system or machine incorporating the memory). Advantageously, this memory zone left to the disposal of the user, namely this zone that is not write protectable, takes the form of a block of adjacent registers (whose addresses are consecutive), thus simplifying management by programming.

Further, the size of the protected zone is defined by specifying a single boundary address, and the other boundary address must be that of the last register. This allows simplicity of verification of protection which is done prior to any write operation in the memory.

Additionally, defining the protected zone as being in the upper part of the memory between the boundary address and the address of the last register R256 (while including these addresses) then implies that the register R256 in which the protection word is stored is itself part of the protected zone. Consequently, unless the logic value present in the above-mentioned pin of the memory is modified, the size of the protected zone can no longer be modified and the protection itself can no longer be deactivated since the size and the protection are determined by the value of the binary word stored in a last register R256 and this register can no longer be modified.

However, such a memory also has drawbacks. For example, if the program that drives a system incorporating the memory has to define a protected memory zone with a specified size, then the program has to know the capacity of the memory in order to be able to deduce therefrom the boundary address whose most significant bits will constitute the most significant bits of the programming word. In other words, the boundary address that must be considered in order to define a write-protectable memory zone of a specified size is a relative address that depends on the address of the last register of the memory. And this address depends on the size of the memory (i.e., the capacity). However, the software that directs the system and, by virtue of this role, manages the different resources (and, in particular, coordinates the memory read and write operations) does not necessarily know the size of the memory or memories contained in the system. In fact, one and the same electronic system is often made into several versions: a basic version having low memory capacity and more sophisticated versions having greater memory capacities. These different versions of the electronic system therefore have memories generally belonging to one and the same family of components (so that their modes of connection and addressing are identical) but have different capacities.

While procedures have been proposed for the recognition of the capacity of the memories present in the system, these methods are complex and require substantial processing time. Such procedures are launched whenever the system is put into operation. The addressing of the memory space is still a relative addressing procedure, but the designer of the system is no longer required to take account of the capacity of the memories used to implement it. Furthermore, such procedures may themselves require the safeguarding of an initialization program that increases the requirements of the system in terms of memory space.

SUMMARY OF THE INVENTION

The present invention seeks to provide the designer of an electronic system or machine that uses one or more electrically erasable and programmable non-volatile memories with the possibility of reserving a write-protectable zone of the memory space that is defined with respect to its size by an absolute address. In other words, a boundary address of the protected zone and the size of this zone are related by an unequivocal relationship which in particular is independent of the capacity of the memory.

Accordingly, one embodiment of the present invention include a memory having memory registers addressable individually or by blocks, and a protection register in which a protection word can be written to define the size and location (e.g., in the upper part or the lower part of the memory) of a write-protectable memory zone. Thus, the user is able to selectively define the write-protectable zone as being the lower zone or the upper zone of the memory. This choice results from the programming of the protection register.

When the write-protectable zone is the lower zone of the memory, the zone is defined by the address of the first register (zero) and the boundary address. Thus, the size of the protectable memory zone is the value of the boundary address. To define the boundary address from a value of the size of the memory zone that has to be write-protected is therefore an absolute addressing operation. The boundary address that has the protection word is then independent of the capacity of the memory. However, when the design of the system incorporating the memory makes it necessary to keep the first registers write accessible or reserve them for the storage of other types of data, the user may choose to define the write-protectable zone as being the upper zone of the memory. The addressing will then be a relative addressing.

Therefore, the user can choose whether the protectable zone is located in the upper part or lower part of the memory. In particular, if a system incorporates several identical memories according to the invention, a write-protectable zone could be defined in the upper part of some memories and could be independently defined in the lower part of other memories.

Other objects, features, and advantages of the present invention will become apparent from the following detailed description. It should be understood, however, that the detailed description and specific examples, while indicating preferred embodiments of the invention, are given by way of illustration only and various modifications may naturally be performed without deviating from the present invention.

DETAILED DESCRIPTION OF PREFERRED EMBODIMENTS

Preferred embodiments of the present invention will be described in detail hereinbelow with reference to the attached drawings.

Figure 2:
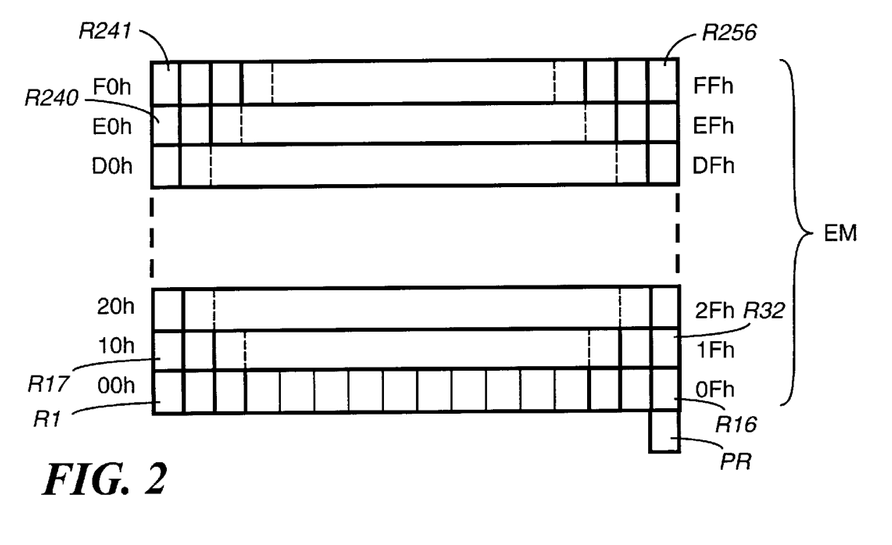
FIG. 2 is a diagram of the organization of the memory space of a memory according to a preferred embodiment of the present invention.

FIG. 2 shows a schematic view of the organization of the memory space of a memory according to a preferred embodiment of the present invention. For ease of comparison with the conventional memory described above, the preferred embodiment of the present invention is described below with reference to a 2 kilobit (2 Kbit) memory organized into 256 8-bit registers R1 to R256. However, the present invention is not limited to such a configuration. The 256 registers are organized in a matrix EM having 16 rows and 16 columns. By convention, the first row is the bottom row in FIG. 2 and the first column is the left-hand column. The first register R1 is thus at the bottom left-hand of the matrix EM, and the sixteenth register R16 is represented at the bottom right-hand of the matrix EM. The 17th register R17 is represented at the top of the register R1, and the register R241 is represented at the top left-hand of the matrix EM. The last register R256 is represented at the top right-hand of the matrix EM.

Each register is identified by an address expressed in hexadecimal notation. In FIG. 2, the left-hand part of the matrix EM has the addresses of the registers of the first column R1, R7, . . . , R241. At the right-hand of the matrix EM, there are also the addresses of the registers of the last column R16, R32, . . . , R256. The registers are accessible in write mode and in read mode by furnishing the appropriate address. In the preferred embodiment, the memory cells are EEPROM-type cells. In other embodiments, the memory cells may be of another type such as flash EPROM-type cells.

The memory space of the memory of FIG. 2 includes a protection register PR schematically depicted beneath the register R16 of the matrix EM. Preferably, this protection register is physically distinct from the memory registers of the matrix EM. The protection register is accessible in a particular mode, an example of which is given below. For the user of the memory (i.e., the designer of an electronic system that incorporates the memory) the memory space available for its application is a total of 256 registers R1 to R256. The management of the available memory space is thereby facilitated because, as compared with the conventional memory described above, no register of the memory space itself has to be dealt with in a special way as a protection register. Thus, greater facility of use of the memory is provided so the corresponding technical documentation will be much simpler and easily interpreted by the user.

Preferably, but not necessarily, the protection register will be formed of memory cells of the same type as the cells of the memory registers. The method of manufacture of the integrated circuit is then unique, and the manufacture of the memory is therefore faster and less costly.

Figure 3:
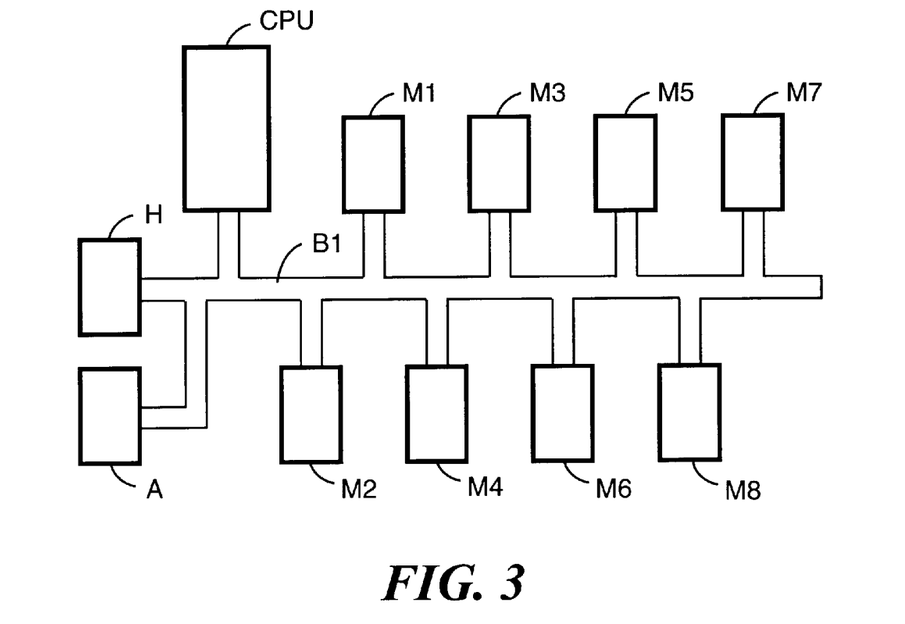
FIG. 3 exemplifies an electronic system incorporating memories.

FIG. 3 shows a schematic view of an exemplary embodiment of an electronic system incorporating one or more memories in accordance with the present invention. In this embodiment, the system has eight memories M1 to M8 that are connected by a bus B1 to a central processing unit CPU such as a microprocessor. A clock H and a supply circuit A are also connected to the bus B1. Other components (not shown) may also be connected to the bus depending on the desired application. For example, the system can include peripheral circuits managed by the microprocessor or interface circuits with external elements controlled by the microprocessor.

Figure 4:
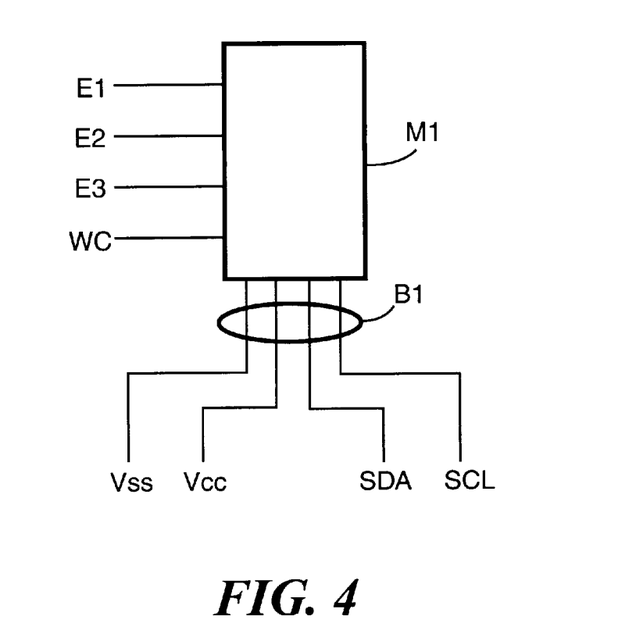
FIG. 4 is a diagram showing the connections of a memory chip in accordance with an embodiment of the present invention.

FIG. 4 shows a view of one of the memory chips of FIG. 3. As stated above, the memory M1 is preferably an EEPROM, but could also be another type of memory such as a flash EPROM. The memory is designed to communicate with the other components of the system according to a communications protocol complying with the I²C standard. It is therefore suited for use in multiplexed systems using an I²C bus. However, the invention is not limited to memories using such a protocol. The invention can also be applied to memories using another communications protocol as well as so-called parallel memories using no particular protocol. The I²C busses are used extensively in making electronic systems for articles of large-scale consumption such as video devices (television sets, video taperecorders, and the like) or automobiles (car radios, ABS equipment or equipment to activate airbags, and the like). Other examples of the use of I²C busses include systems using microprocessor-based card readers (chip card readers).

An I²C bus of this kind has two lines: (1) an SDA line for the two-way serial transmission of control signals, addresses and data elements; and (2) an SCL line for the transmission of a clock signal generated by the clock circuit H (see FIG. 3). The memory chip M1 of FIG. 4 has four pins (or input terminals) designed to be connected to the I²C-type bus B1 of FIG. 3 so as to receive the signals SDA, SCL, Vss and Vcc. It also has three input terminals E1, E2, E3 designed to be taken to a DC voltage with a constant value equal to 5 volts or ground. The levels of the voltages applied to the inputs E1, E2, E3 are used to differentiate between a plurality of memory chips connected to one and the same bus (e.g., as chip selects). Eight identical memories are connected to the bus B1 in the exemplary system of FIG. 3. Finally, the memory chip M1 has an input terminal WC, called an input protection terminal, whose use is explained below with reference to FIGS. 7a to 7c.

Figure 5A:
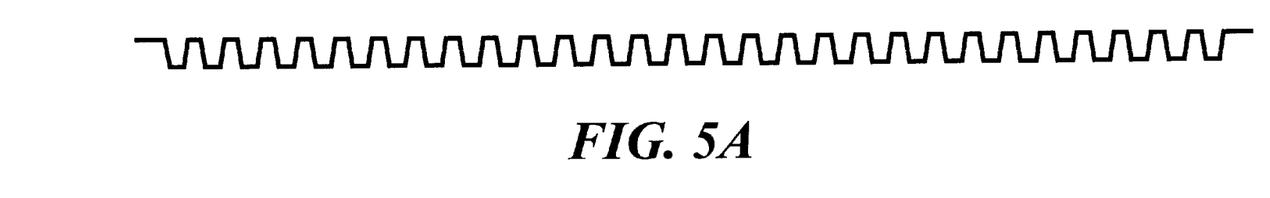
FIGS. 5a and 5b are timing diagrams showing a write sequence in a memory using an I²C communications protocol.
Figure 5B:
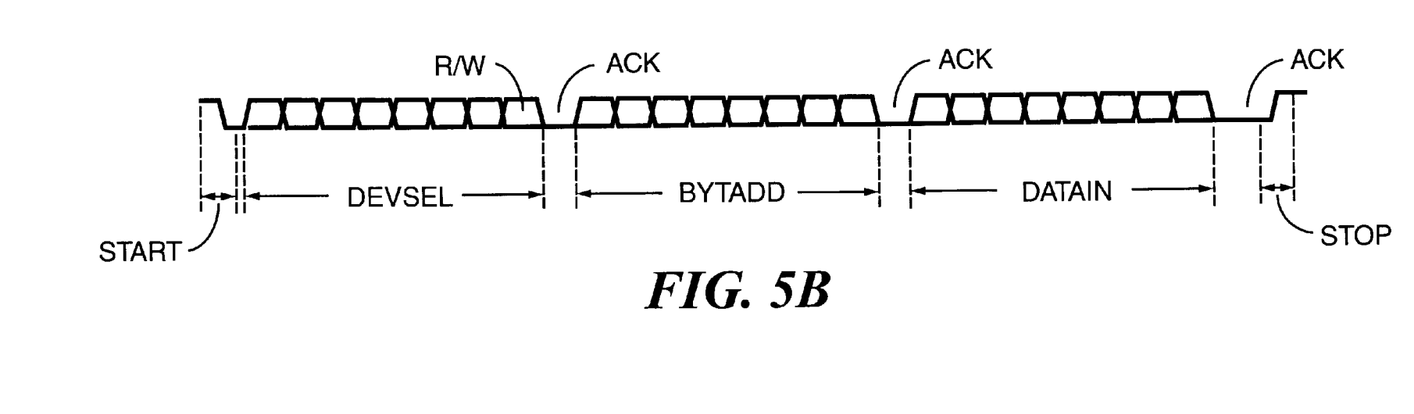

FIGS. 5a and 5b show a sequence of signals transmitted by the I²C bus for direct access to a single register of the memory. Such direct access requires an indication of the address of the selected register. (It will be observed that other modes of memory access are also possible such as a sequential mode or a "page" mode. Reference may be made to the technical literature on I²C-type busses for further details on these and other modes of access to the memory.) FIG. 5a shows the clock signal transmitted by line SCL, and FIG. 5b shows the signal transmitted on line SDA of the bus. The access sequence starts with a condition relating to the start of transmission. This condition, referenced START in the figures, is achieved when a trailing edge occurs on line SDA while line SCL is in the logic 1 state. Then, to each pulse of the clock signal on line SCL, there corresponds an information bit transmitted serially on line SDA. It will be noted that the value of the bits transmitted on line SDA changes (as the case may be) when line SCL is in the logic state 0. The sequence continues with the transmission of an 8-bit chip selection word DEVSEL, of which the four most significant bits correspond to a code for the identification of the component connected to the bus that is selected by the sequence. For example, for the memories, this identification code corresponds, according to the I²C standard, to the value 1010b. The next three bits correspond to the code for the selection of a chip from among the different chips of the same type connected to the bus. The value of these three bits must be compared with the level of the voltages carried to the inputs E1, E2, E3 of each memory, to determine which of the eight memories M1 to M8 is selected by the access sequence. The last bit R/W of the selection word DEVSEL distinguishes between a write access and a read access. For a write access, this bit has a value of 0 (R/W=0), and for a read access, the value is 1 (R/W=1). After the reception of the chip selection code, the selected chip sends an acknowledgment bit ACK (e.g., having logic value 0) on line SDA. This is a bit having the logic value 0. The microprocessor CPU then sends an 8-bit word BYTADD on the bus corresponding to the address of the memory register selected by the access sequence. Upon reception of this word, the memory again sends out an acknowledgment bit ACK. For a write access (R/W=0), the microprocessor CPU then sends an 8-bit data word DATAIN on the bus corresponding to the data to be written. The reception of the data word DATAIN by the memory chip is confirmed by the transmission of another acknowledgment bit ACK by the memory chip. On the other hand, for a read access (R/W=1), the data word DATAIN is placed on the bus by the memory and the microprocessor sends an acknowledgment bit ACK when the data word is received. The access sequence ends with an end-of-transmission condition (referenced STOP in the figures) that occurs when a leading edge is on line SDA while line SCL is in the logic 1 state.

The sequence of access to the memory according to the I²C protocol described above for access in normal mode is adapted according to the invention so as to provide for access to the protection register PR of each memory chip, as will now be described. As explained, the four most significant bits of the chip selection word DEVSEL have a particular value (i.e., the value 1010b) when the access relates to a memory. This value is determined by the I²C standard itself. According to an original arrangement of the present invention, the protection register PR of a specified memory chip is accessed by giving the four most significant bits of the selection word DEVSEL a different predetermined value that is capable of being interpreted by the memory as meaning that the access sequence relates to the protection register PR. For example, the value could be 0110b. Consequently, the address word BYTADD transmitted after the chip selection word DEVSEL on the I²C bus plays no role in the protection register access sequence. Such an arrangement allows the access to function as if the protection register PR were actually included in an independent chip connected to the bus and distinguished from similar chips by the level of the voltages present at the three inputs E1, E2, E3.

The access procedure for the protection register PR described here is only one example for a memory communicating through a protocol according to the I²C standard. The principle of definition of a write-protectable zone in a memory according to the characteristics of the present invention can also be applied to other types of memory, so that other types of access to the protection register PR can naturally be envisioned in accordance with the principles of the present invention. For example, the protection register may be accessible by the furnishing of an address of a particular value, which would be the case for example if the protection register were actually a particular memory register.

Figure 6:
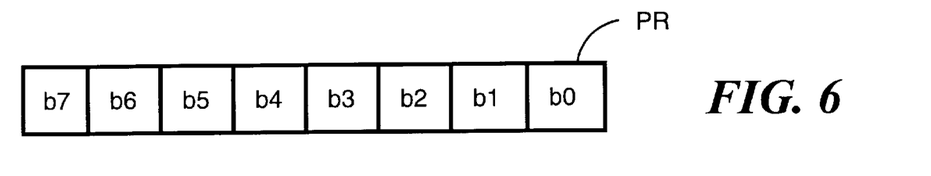
FIG. 6 shows bits of the protection register.

A description will now be given of the principle used to define the zones of the memory in accordance with the preferred embodiment of the present invention. FIG. 6 shows a detailed view of the protection register PR. In the preferred embodiment, the protection register is an 8-bit register, but it could have a different size (e.g., a bigger register if the memory has a bigger capacity requiring addressing by a number of bits greater than 7).

The protection register PR is designed to store a protection word of 8 bits that has a twofold function. First, some of the bits define the address of a particular memory register or a group of particular memory registers that divide the memory space into a lower zone and an upper zone. The lower zone will be the zone identified between the address 00h of the first register and the boundary address, while the upper zone will be the zone between the boundary address (including the boundary address) and the address FFh of the last register R256. One particular bit of the protection word stored in the register PR, which is known as a zone bit, determines which of the two zones (i.e., the upper zone or the lower zone) is write-protectable. For example, the zone bit could be the most significant bit B7 of the protection word. Thus, with one 8-bit protection word, 7 bits B0 to B6 of the protection word are actually available to encode the boundary address. In the preferred embodiment, the memory registers R1 to R256 are 256 in number, so that the seven least significant bits B0 to B6 of the protection word (of 8 bits) are not enough to determine the full address of a particular memory register. In fact, only the four least significant bits B0 to B3 are used to encode the address of a block of registers. (The expression "block of registers" designates a group of registers whose addresses are consecutive or adjacent and therefore have most significant bits of identical values.) Thus, because the memory is physically organized into rows of 16 registers each, as described above, the four least significant bits B0 to B3 of the protection word provide for the definition of the common address of the registers of a block having the registers of one physical row. Thus, in the preferred embodiment of the present invention, a block of registers is identified with a physical row of registers as laid out on the silicon of the memory. Hereinafter, the phrase "physical page of memory" is also used to designate such a block because it is actually the physical page as it is formed on silicon. It is known that the physical page is defined as the elementary pattern of the memory array that is reproduced a specified number of times so as to constitute a memory with a specified capacity. Thus, the capacity of the memory can be expressed as a multiple of the number of cells (or bits) in a physical page of the memory. In the example, the memory has a "128" capacity because each row of the memory array corresponds to sixteen eight-bit registers or 128 memory cells.

With such an arrangement, the boundary address defining the upper zone and the lower zone of the memory is the address of a block of such registers. Thus, the size of the protectable zone is also a multiple of the number of cells corresponding to a physical page. In particular, this means that the smallest size possible for the write-protectable zone corresponds to a physical page. This is particularly advantageous because the memory conventionally includes means for selecting all the cells of one physical page to allow simultaneous access to all such cells (i.e., a "page mode").

Figure 7A:
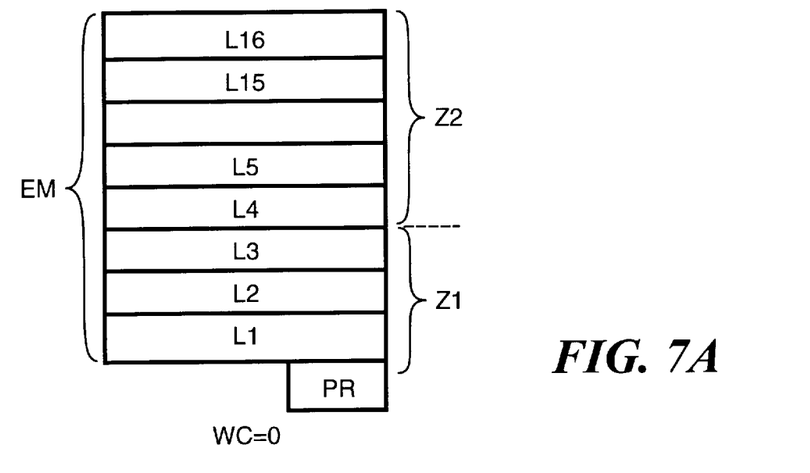
FIGS. 7a to 7c are schematic views of three possible configurations of a memory organized by blocks of registers.
Figure 7B:
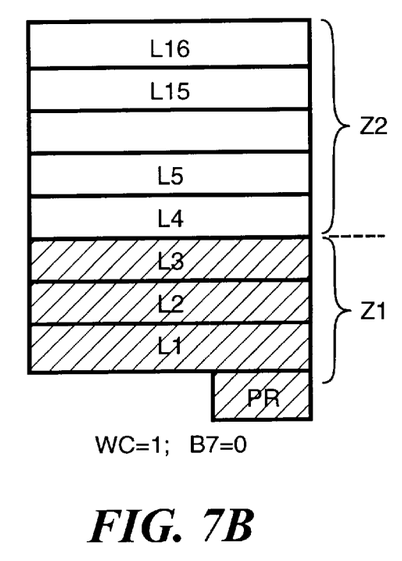
Figure 7C:
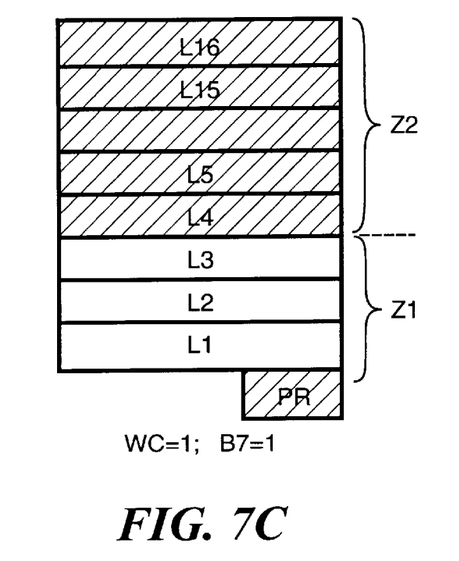

FIGS. 7a, 7b, and 7c show three schematic views of the memory space EM and the protection register PR. The memory space is represented by a single column of 16 rows corresponding to an equivalent number of physical pages of the memory. The rows are referenced L1 to L16. The protection register PR is shown below the first line L1. As explained above, the protection word recorded in the protection register has the twofold function of specifying the size and location of a memory zone that is protectable (i.e., a zone capable of being protected or not protected). In fact, this zone is actually protected (here in write mode but a read and/or write protection can also be envisioned without altering the principle of the invention) or not protected depending on the voltage level present at the input protection terminal WC of the memory chip (see FIG. 4). Thus, the input protection terminal has the function of enabling or disabling memory protection. This terminal can receive a logic signal whose state is determined by the electronic system (by programming or by so-called "wired" logic) or it may be connected to the positive supply source or to ground physical connection with the +5 voltage or with ground).

FIG. 7a shows the memory when the input protection terminal is connected to ground (WC=0). The protection of the memory is disabled so all the memory registers are write-accessible. That is, the memory is not write-protected whatever the value of the word contained in the protection register. Further, the protection register is not write-protected. In FIGS. 7b and 7c, the input protection terminal WC is connected to the positive supply voltage so that it is at a level corresponding to a logic 1 state (WC=1). The protection of the memory is then enabled. Thus, the memory zone that is protectable is actually protected during operation. Likewise, the protection register is write protected. It will be noted that in the preferred embodiment the protection register PR is write protected at the same time and under the same conditions as the read and/or write protectable memory zones. This is justified by the fact that the protection word which it contains specifies the size and location of the zone so if it is not write protected at the same time as the zone, it will be easy to modify its contents and thus deprive the memory protection of any real effect.

The state of the memory shown in FIG. 7b can be distinguished from that shown in FIG. 7c by the value of the zone bit B7 of the protection word stored in the protection register PR. In FIG. 7b, the zone bit is in the logic 0 state (B7=0). Thus, the memory zone that is protected is the lower zone Z1, having for example the registers of rows L1 to L3 that are shaded in gray. The upper zone Z2 is not write-protected so it is possible to write data in the memory registers contained in the upper zone. FIG. 7c shows the state of the memory when the zone bit of the protection word is in the logic 1 state (B7=1). In this state, the upper zone Z2 is write-protected, and the lower zone Z1 is write-accessible.

The protection register PR is write-protected regardless of the state of bit b7 of the protection word whenever the input protection terminal WC is in the logic 1 state (WC=1), as explained above. In some applications, this terminal WC of the memory chip receives a logic signal transmitted by connections internal to the electronic system. However, in the preferred embodiment having an I²C-type bus without any other logic connections, the terminal WC is preferably permanently connected to the positive supply source so that memory protection is always active.

It will be noted that even when the input protection terminal WC is permanently held in the logic 1 state, it is possible to make the entire memory space accessible in write mode by writing the word 00000000b in the protection register PR. However, a particular problem arises during the first use of the memory to access the contents of the register PR at least once so as to store therein a protection word that will define the size and location of the protected zone. This problem is resolved in the preferred embodiment by the fact that the memory includes an inhibition circuit that inhibits the write protection when the protection register is blank. Through this circuit, the protection is active only when a protection word has been written into the protection register. Thus, during the delivery of the memory chip to the user, the protection register is made blank (i.e., it contains the value 00000000b) so that it is possible for the user, at least once, to write the protection word of his choice in order to customize the memory (i.e., adapt it to the specific requirements of the desired application).

Figure 8:
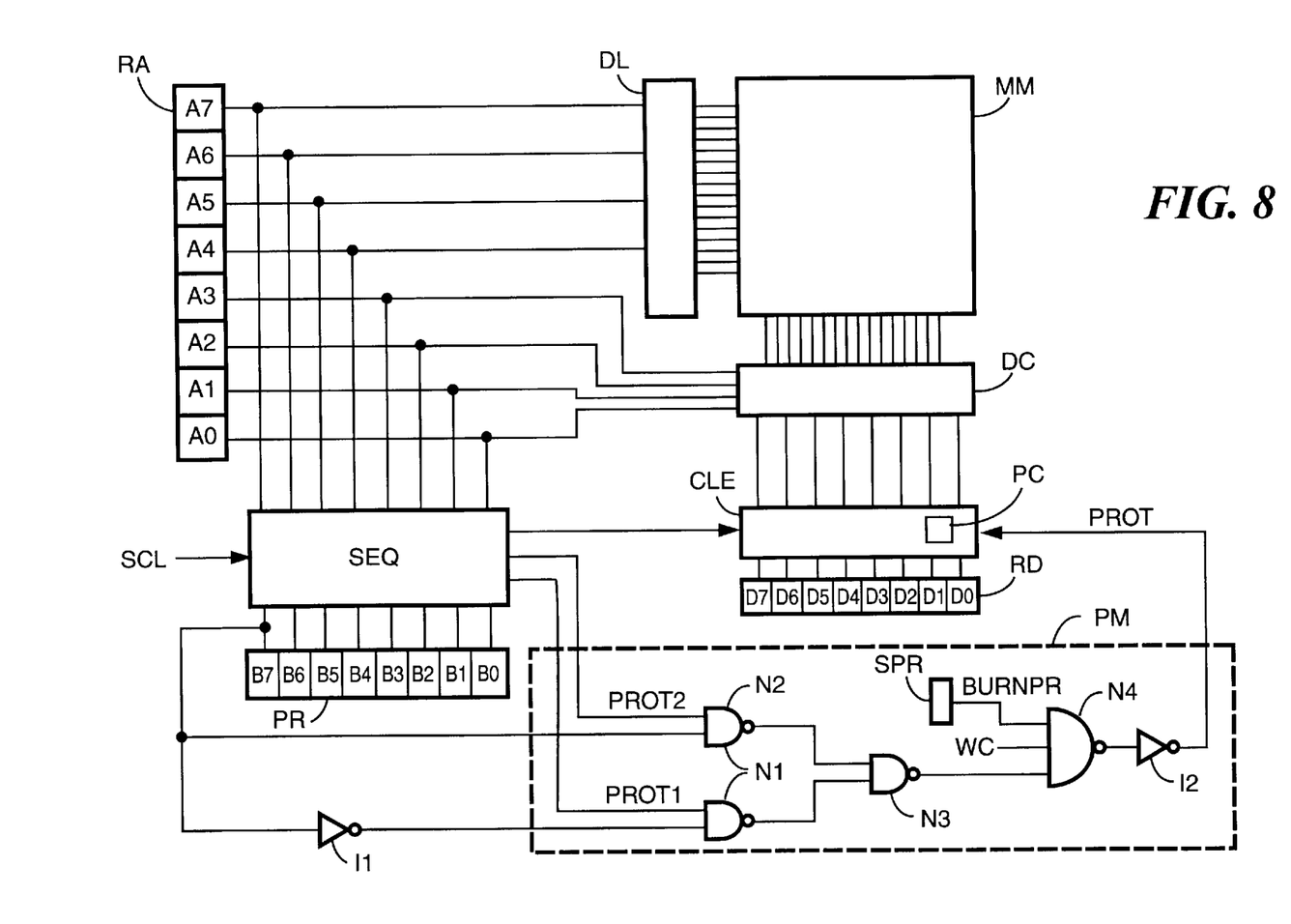
FIG. 8 is a drawing of the internal organization of the memory of the preferred embodiment of the present invention.

The above-mentioned inhibition circuit, which is designed to inhibit the write protection of the protection register PR despite the fact that the input protection terminal WC is in the logic 1 state, will now be described. FIG. 8 shows the internal organization of the memory of the preferred embodiment of the present invention. The memory array MM is connected to an address register RA by a row decoder DL and a column decoder DC. The four least significant bits A0, A1, A2, A3 of the address register RA are transmitted to the column decoder DC, and the four most significant bits A4, A5, A6, A7 are transmitted to the input of the row decoder DL. The operation of the memory during a read or write operation is piloted by a sequencer SEQ that is connected to the 8 bits of the address register RA. According to the preferred embodiment in which the size of the protected zone is defined by 16-register blocks, the sequencer SEQ could be connected to only the four most significant bits A4, A5, A6 and A7 of the register RA. The sequencer SEQ also receives the clock signal through line SCL of the data bus. The row decoder DL and the column decoder DC act as demultiplexers to select the cells or the block of memory cells selected by the current read or write operation. Thus, the row decoder is connected to the memory array by sixteen word lines, and the column decoder DC is connected to the memory array MM by sixteen lines that each control a selection transistor. This selection transistor makes it possible to select eight memory cells constituting a memory register.

A read and write circuit CLE is also connected to the memory array by eight bit lines on which the data elements are transmitted from or to the memory array MM (depending on whether the operation is a read or write). The read circuit CLE is also connected to a data register RD, which is an 8-bit register. The read circuit CLE receives a control signal from the sequencer SEQ to enable operation.

The protection register PR, which for example is an 8-bit register, is connected to the sequencer circuit SEQ. The sequencer always checks the state of the bits B0 to B7 of the protection register. More specifically, as stated above, the sequencer controls the four least significant bits B0 to B3 and the most significant bit B7 which respectively define the size and location of the memory zone that is write protected. The sequencer circuit SEQ has circuitry for comparing the four most significant bits A4, A5, A6, A7 of the address contained in the address register RA and the value of the 4 bits B0, B1, B2, B3 of the protection word contained in the register PR. This is a bit-by-bit comparison.

The memory also includes a protection circuit PM that generates a protection signal PROT, which is transmitted to the read/write circuit CLE so as to permit or not permit a read or write operation. The protection circuit includes a first NAND gate N1 that receives a signal PROT1 generated by the sequencer SEQ and the logic complement of bit B7 (transmitted by an inverter I1). The circuit also includes a second NAND gate N2 that receives a signal PROT2 generated by the sequencer SEQ and the logic state of bit B7 of the protection register PR. The signal PROT1 is in the logic 1 state when the word A7A6A5A4 is smaller than the word b3b2b1b0 (A7A6A5A4<b3b2b1b0), and otherwise is in the logic 0 state. The signal PROT2 is in the logic 1 state when the word A7A6A5A4 is greater than or equal to the word b3b2b1b0 (A7A6A5A4>b3b2b1b0), and otherwise is in the logic 0 state. The outputs of the NAND gates N1 and N2 are transmitted to a third NAND gate N3. The output of the third NAND gate N3 is transmitted to a three-input NAND gate N4, which also receives the signal at the input protection terminal WC of the memory and a signal BURNPR. The logic state of the signal BURNPR is determined by the state of a cell SPR, which is for example, an EEPROM cell distinct from those of the memory array MM and of the protection register PR. The function of the cell SPR is to indicate whether the protection register PR is blank or not. The output of the NAND gate N4 is transmitted to a second inverter I2 whose output delivers a protection signal PROT. The protection signal is transmitted to an input of the memory read/write circuit CLE.

The protection circuit PM operates as follows. When the memory is delivered to its user, the cell SPR is in the logic 0 state. This is because the protection register PR is blank (because it has never been programmed). Thus, whatever the logic state at the input protection terminal WC and whatever the logic state of the signals PROT1 and PROT2 and of bit b7, the signal PROT is in the logic 0 state. Consequently, the read/write circuit CLE performs the write operation at reception of the command transmitted by the sequencer SEQ. In other words, all the registers of the memory are write-accessible so long as the protection register is blank.

When the control sequence received by the memory is a write sequence directed to the protection register PR (identification code of the component equal to 0110b), the writing in the register PR simultaneously prompts the writing of the logic 1 value in the cell SPR. Thus, after the first write operation in the register PR, the cell SPR is in the logic 1 state (because the protection register PR is no longer blank). The signal BURNPR taken to the input of the gate N4 is then in the logic 1 state. In this manner, the cell SPR is used to inhibit the protection of the memory even when the input protection terminal WC is in the logic 1 state. This inhibition function is fulfilled within the protection circuit PM through the three-input NAND gate N4. Naturally, other protection circuitry could also be used. When the protection register is no longer blank (SPR=1), the signal PROT is in the logic 1 state when the input protection terminal WC is in the logic 1 state and either (A7A6A5A4<b3b2b1b0 and b7=0) or (A7A6A5A4>b3b2b1b0 and b7=1).

In the preferred embodiment, the signal PROT transmitted to the input of the read/write circuit CLE acts on the load pump, which generates the high programming voltage that is needed to write to the EEPROM cells of the memory array MM. Thus, when the signal PROT is in the logic 1 state, the operation of the load pump is inhibited so that the write operation cannot be performed by the circuit CLE. Other ways of using the protection signal can also be implemented. For example, the signal could be supplied to the sequencer SEQ so that, through suitable combinational logic circuits, the write operation is prevented. While the writing in the protection register PR is advantageously done by the circuit CLE and the sequencer SEQ, other circuitry is used to write in the protection register in some embodiments.

Thus, the present invention allows the user to determine the location of the protectable zone (i.e., whether it should be in the upper part or lower part of the memory). In particular, one and the same electronic system may incorporate at least one memory in which a protectable zone is in the upper part and at least one other memory for which a protectable zone is in the lower part In other words, for each of these memories, the location of the protectable zone in the upper part or lower part of the memory is determined independently of the other memory or memories. This provides enormous possibilities to the user who can obtain the advantages of either location. Further, the protectable zone is determined in size by a single boundary address which is either that of a particular register or that of a block of registers (depending on the size of the address of a memory register and the number of bits available in the protection register to encode this address). Furthermore, the block of unprotected registers remains a block of adjacent registers.

While the invention has been described above with reference to an embodiment having a memory with 256 eight-bit registers each, it is not limited in its principle to memories organized in this way. Similarly, the use of a serial access-type memory using a communications protocol in accordance with the I²C standard is given purely by way of illustration and in no way is meant to restrict the scope of the invention. Further, while the invention has been described in the context of write protection, it is not so limited and can also be applied to read protection or read and write protection. Also, as explained above, the present invention can be implemented in EEPROM-type memories and in other types of memories such as block-erasable flash EPROM-type memories.

While there has been illustrated and described what are presently considered to be the preferred embodiments of the present invention, it will be understood by those skilled in the art that various other modifications may be made, and equivalents may be substituted, without departing from the true scope of the invention. Additionally, many modifications may be made to adapt a particular situation to the teachings of the present invention without departing from the central inventive concept described herein. Therefore, it is intended that the present invention not be limited to the particular embodiments disclosed, but that the invention include all embodiments falling within the scope of the appended claims.

What is claimed is:

1. A non-volatile semiconductor memory comprising:
  a plurality of memory registers that are addressable individually or by blocks; and
  a protection register for storing a protection word that defines both the size of a write-protectable memory zone and whether the memory zone is located in an upper part or a lower part of the memory,
  wherein for at least one value of the protection word, the memory zone is located in an upper part of the memory, and
  for at least one other value of the protection word, the memory zone is located in a lower part of the memory.

2. The non-volatile semiconductor memory as defined in claim 1, wherein the protection word comprises:
  a predetermined number of bits that are used to encode the address of one of the memory registers or a block of the memory registers so as to define a boundary address that divides the memory space into the upper part and the lower part; and a zone bit having a value that determines whether the write-protectable memory zone is in the upper part or the lower part of the memory.

3. The non-volatile semiconductor memory as defined in claim 2, wherein the boundary address comprises the address of a block of memory registers that correspond to a physical page of the memory.

4. The non-volatile semiconductor memory as defined in claim 1, wherein the protection register is physically separate from the memory registers.

5. The non-volatile semiconductor memory as defined in claim 1, wherein the protection register is write protected at the same time and under the same protection conditions as the write-protectable memory zone.

6. The non-volatile semiconductor memory as defined in claim 1, wherein the write-protectable memory zone is write protected whenever a predetermined input terminal of the memory is at a predetermined logic level.

7. The non-volatile semiconductor memory as defined in claim 6, further comprising:

a protection circuit that generates a protection signal; and an inhibition circuit that inhibits the protection signal when the protection register is blank.

8. The non-volatile semiconductor memory as defined in claim 1, wherein the memory is a serial access memory that uses an $I^2C$-type protocol, and predetermined bits of a selection word received during a memory access sequence are at a first value when accessing the contents of the memory registers and are at a second value when accessing the contents of the protection register.

9. The non-volatile semiconductor memory as defined in claim 1, wherein the protection word comprises:

a single boundary address that divides the memory space into the upper part and the lower part; and a zone bit having a value that determines whether the write-protectable memory zone includes the memory registers at addresses above the boundary address or the memory registers at addresses below the boundary address.

10. An electronic system comprising:

at least two non-volatile semiconductor memories, each of the semiconductor memories comprising:

a plurality of memory registers that are addressable individually or by blocks; and a protection register for storing a protection word that defines both the size of a write-protectable memory zone and whether the memory zone is located in an upper part or a lower part of the memory, wherein for at least one value of the protection word the memory zone is located in an upper part of the memory, and for at least one other value of the protection word, the memory zone is located in a lower part of the memory, wherein the location of the write-protectable zone in one of the memories is determined independently of the location of the write-protectable zone in another of the memories.

11. A non-volatile semiconductor memory comprising:

memory registers; and a protection register for storing a protection word, the protection word defining both the size of a protectable memory zone and whether the memory zone is located in an upper part or a lower part of the memory, wherein for at least one value of the protection word, the memory zone is located in an upper part of the memory, for at least one other value of the protection word, the memory zone is located in a lower part of the memory, and at least one of read access to memory registers in the protectable memory zone and write access to memory registers in the protectable memory zone is selectively prohibited.

12. The non-volatile semiconductor memory as defined in claim 11, wherein the protection word comprises:

a single boundary address that divides the memory space into the upper part and the lower part; and a zone bit having a value that determines whether the write-protectable memory zone includes the memory registers at addresses above the boundary address or the memory registers at addresses below the boundary address.

13. The non-volatile semiconductor memory as defined in claim 11, wherein the protection word further includes:

a predetermined number of bits that are used to encode the address of one of the memory registers or a block of the memory registers so as to define a boundary address that divides the memory space into an upper part and a lower part; and a zone bit whose value determines whether the protectable memory zone is in the upper part or the lower part of the memory.

14. The non-volatile semiconductor memory as defined in claim 13, wherein the protection register is physically separate from the memory registers.

15. The non-volatile semiconductor memory as defined in claim 13, wherein access to the protection register is prohibited at the same time and under the same conditions as access to the protectable memory zone is prohibited.

16. The non-volatile semiconductor memory as defined in claim 13, further comprising:

a protection circuit that generates a protection signal; and an inhibition circuit that inhibits the protection signal when the protection register is blank.

17. An electronic system including at least one non-volatile semiconductor memory, said semiconductor memory comprising:

a plurality of memory registers that are addressable individually or by blocks; and a protection register for storing a protection word that defines both the size of a write-protectable memory zone and whether the memory zone is located in an upper part or a lower part of the memory, wherein for at least one value of the protection word, the memory zone is located in an upper part of the memory, and for at least one other value of the protection word, the memory zone is located in a lower part of the memory.

* * * * *